United States Patent
Lee et al.

(10) Patent No.: US 8,774,779 B2
(45) Date of Patent: Jul. 8, 2014

(54) SYSTEM, METHOD, SERVICE SERVER, TRAFFIC INFORMATION RELAY METHOD, APPLICATION SERVER, MOBILE COMMUNICATION TERMINAL, NAVIGATION TERMINAL, EXECUTION METHOD, AND STORAGE MEDIUM FOR PROVIDING TRAFFIC INFORMATION USING SHORT-RANGE COMMUNICATION NETWORK

(75) Inventors: Jeong Hoon Lee, Seoul (KR); Jeong Min You, Seoul (KR); In Hwan Kim, Seoul (KR); Sung Mu Son, Seoul (KR)

(73) Assignee: SK Planet Co. Ltd. (KR)

( * ) Notice: Subject to any disclaimer, the term of this patent is extended or adjusted under 35 U.S.C. 154(b) by 439 days.

(21) Appl. No.: 13/126,663

(22) PCT Filed: Jul. 29, 2009

(86) PCT No.: PCT/KR2009/004205
§ 371 (c)(1),
(2), (4) Date: Apr. 28, 2011

(87) PCT Pub. No.: WO2010/050664
PCT Pub. Date: May 6, 2010

(65) Prior Publication Data
US 2011/0212686 A1 Sep. 1, 2011

(30) Foreign Application Priority Data
Oct. 28, 2008 (KR) .................. 10-2008-0105767

(51) Int. Cl.
*H04L 29/06* (2006.01)
*H04M 11/00* (2006.01)
*H04M 1/66* (2006.01)

(52) U.S. Cl.
USPC ......... 455/414.3; 455/407; 455/408; 455/411

(58) Field of Classification Search
USPC .............. 455/404.2, 405, 406, 407, 408, 410, 455/411, 414.3
See application file for complete search history.

(56) References Cited

U.S. PATENT DOCUMENTS

| | | | |
|---|---|---|---|
| 6,549,625 B1 * | 4/2003 | Rautila et al. .................. 380/258 |
| 2002/0049529 A1 * | 4/2002 | Ikeda ............................ 701/200 |
| 2004/0156487 A1 * | 8/2004 | Ushiki et al. ................ 379/88.22 |
| 2006/0167616 A1 * | 7/2006 | Yamane et al. ................ 701/117 |
| 2008/0208449 A1 * | 8/2008 | Jung et al. ..................... 701/201 |

FOREIGN PATENT DOCUMENTS

| | | |
|---|---|---|
| JP | 2001-197150 | 7/2001 |
| JP | 2001-211479 | 8/2001 |
| JP | 2002-286458 | 10/2002 |
| JP | 2003-058661 | 2/2003 |
| JP | 2004-021331 | 1/2004 |
| JP | 2004-221890 | 8/2004 |
| JP | 2004-325366 | 11/2004 |
| JP | 2005-222381 | 8/2005 |
| KR | 100519627 | 10/2005 |
| KR | 1020050103070 | 10/2005 |
| KR | 1020070051523 | 5/2007 |
| KR | 1020070059618 | 6/2007 |
| KR | 100738927 | 7/2007 |
| KR | 1020080078085 | 8/2008 |
| KR | 1020080083401 | 9/2008 |

* cited by examiner

*Primary Examiner* — Ping Hsieh
*Assistant Examiner* — Xin Jia
(74) *Attorney, Agent, or Firm* — Baker Hostetler LLP

(57) ABSTRACT

The present invention relates to a system, a method, a service server, a traffic information relay method, an application server, a mobile communication terminal, a navigation terminal, an execution method, and a storage medium for providing traffic information using a short-range communication network, and more specifically to a technique for providing traffic information using a short-range communication network, in which a navigation terminal connectible to the short-range communication network receives traffic information from an application server connected to a mobile communication network via the mobile communication terminal and the service server, thereby overcoming restrictions of communication networks. A system for providing traffic information according to the present invention comprises: a navigation terminal connected to a mobile communication terminal through the short-range communication network, for executing the traffic information requested and received from an application server; the mobile communication terminal connected to the navigation terminal through the short-range communication network and connected to a service server through a mobile communication network, for transferring data between the navigation terminal and the service server; the service server connected to the mobile communication terminal through the mobile communication network and connected to the application server through the mobile communication network or a wired communication network, for performing authentication for the navigation terminal and the mobile communication terminal and requesting the application server to provide the traffic information requested by the authenticated navigation terminal; and the application server connected to the service server through the mobile communication network or the wired communication network, for providing the traffic information requested by the navigation terminal.

6 Claims, 10 Drawing Sheets

SYSTEM, METHOD, SERVICE SERVER, TRAFFIC INFORMATION RELAY METHOD, APPLICATION SERVER, MOBILE COMMUNICATION TERMINAL, NAVIGATION TERMINAL, EXECUTION METHOD, AND STORAGE MEDIUM FOR PROVIDING TRAFFIC INFORMATION USING SHORT-RANGE COMMUNICATION NETWORK

BACKGROUND OF THE INVENTION

1. Field of the Invention

The present invention relates to a system, a method, a service server, a traffic information relay method, an application server, a mobile communication terminal, a navigation terminal, an execution method, and a storage medium for providing traffic information using a short-range communication network, and more specifically to techniques for providing traffic information using a short-range communication network, in which a navigation terminal connectible to the short-range communication network receives traffic information from an application server in a mobile communication network via the mobile communication terminal and the service server, thereby overcoming restrictions of communication networks.

2. Background of the Related Art

With the advancement of information communication technologies, a variety of navigation terminals capable of locating a position or a moving path are installed in a vehicle or carried by a user to be used. Such a navigation terminal stores map information, together with a program for executing the map information. When the map information is changed due to constructions of new roads or buildings, the user downloads the map information from a personal computer (PC) and uses the downloaded map information. However, there is a problem in that the user cannot download updated map information when the user is moving or cannot connect to a PC.

Furthermore, if the navigation terminal is used as a navigator while a vehicle is driving, paths need to be updated in accordance with variation of traffic volumes. Update of paths is accomplished by receiving traffic information from a traffic information collecting center. The traffic information is usually provided by Transport Protocol Expert Group (TPEG). However, such a system does not provide nation-wide information.

SUMMARY OF THE INVENTION

Therefore, the present invention has been made in view of the above problems, and it is an object of the present invention to provide a technique, in which a navigation terminal connectible to a short-range communication network downloads traffic information desired by a user through a mobile communication network and executes the downloaded traffic information.

To accomplish the above object, according to one aspect of the present invention, there is provided a system for providing traffic information using a short-range communication network, the system comprising: a navigation terminal connected to a mobile communication terminal through the short-range communication network, for executing the traffic information requested and received from an application server; the mobile communication terminal connected to the navigation terminal through the short-range communication network and connected to a service server through a mobile communication network, for transferring data between the navigation terminal and the service server; the service server connected to the mobile communication terminal through the mobile communication network and connected to the application server through the mobile communication network or a wired communication network, for performing authentication for the navigation terminal and the mobile communication terminal and requesting the application server to provide the traffic information requested by the authenticated navigation terminal; and the application server connected to the service server through the mobile communication network or the wired communication network, for providing the traffic information requested by the navigation terminal.

In the embodiment, the system may further comprise a billing server connected to the service server through the mobile communication network or the wired communication network, for performing a billing process for the mobile communication terminal when the traffic information is provided to the end-point terminal from the application server.

To accomplish the above object, according to another aspect of the present invention, there is provided a method for providing traffic information through a short-range communication network, performed by a system in which a navigation terminal is connected to a mobile communication terminal through the short-range communication network, and the mobile communication terminal, a service server and an application server are connected to one another through a mobile communication network, the method comprising: an authentication step of allowing the service server to perform authentication for the navigation terminal and the mobile communication terminal in order to provide a service; a traffic information request step of allowing the navigation terminal to select the traffic information from a list provided by the service server and request transmission of the traffic information; and a providing step of allowing the application server to provide the traffic information requested by the navigation terminal.

In the embodiment, the method may further comprise a service request step of allowing the navigation terminal to search for the mobile communication terminal and transmit a service request signal to the searched mobile communication terminal.

In the embodiment, the authentication step may include: a first authentication step of allowing the mobile communication terminal to examine whether or not the navigation terminal is a device that can perform the service; a second authentication step of allowing the navigation terminal to transmit unique identification information of the navigation terminal to the mobile communication terminal, if the navigation terminal is determined as a device that can perform the service in the first authentication step; a third authentication step of allowing the mobile communication terminal to examine whether or not the unique identification information of the navigation terminal is valid; a fourth authentication step of allowing the mobile communication terminal to transmit unique identification information of the mobile communication terminal and the navigation terminal to the service server, if the unique identification information is determined to be valid in the third authentication step; a fifth authentication step of allowing the service server to examine whether or not the mobile communication terminal and the navigation terminal are in a state capable of performing the service, based on the unique identification information and membership information of the mobile communication terminal and the navigation terminal; and a sixth authentication step of allowing the service server to transmit an authentication message to the navigation terminal, if the mobile communication terminal and the navigation terminal are determined to be in a state capable of performing the service in the fifth authentication step.

In the embodiment, the traffic information request step may include: a first traffic information request step of allowing the navigation terminal to transmit information on the connected short-range communication network and a list request message to the service server; a second traffic information request step of allowing the service server to transmit a requested list to the navigation terminal; a third traffic information request step of allowing the service server to transmit traffic information data included in the requested list to the navigation terminal; and a fourth traffic information request step of allowing the navigation terminal to select and transmit the traffic information data included in the list to the service server.

In the embodiment, the traffic information data of the third traffic information request step may include descriptions on the traffic information, a type of a short-range communication network capable of transmitting the traffic information, billing information, a traffic information size, a traffic information format, and a transmission type of the traffic information.

In the embodiment, in the fourth traffic information request steps, the navigation terminal may additionally perform an operation of transmitting billing information to the billing server.

In the embodiment, the providing step may include: a first providing step of allowing the service server to examine whether or not the selected traffic information needs to be converted; a second providing step of allowing the service server to request the application server to convert the traffic information or to convert the traffic information by itself, if the traffic information is determined to be converted in the first providing step; and a third providing step of allowing the service server to transmit the converted traffic information to the navigation terminal.

To accomplish the above object, according to still another aspect of the present invention, there is provided a service server for relaying traffic information, the service server comprising: a communication unit for transmitting and receiving data through a mobile communication network; a mobile communication terminal management unit for managing information on a mobile communication terminal received through the communication unit; a navigation terminal management unit for managing information on a navigation terminal received through the communication unit; a short-range communication network management unit for managing information on a short-range communication network that relays communications between the mobile communication terminal and the navigation terminal; a storage unit for storing the mobile communication terminal information, the navigation terminal information, and the short-range communication network information; and a control unit for controlling operations of each constitutional component, authenticating the mobile communication terminal and the navigation terminal based on the mobile communication terminal information and the navigation terminal information, and controlling the communication unit to transfer the traffic information received from the application server to the mobile communication terminal.

To accomplish the above object, according to still another aspect of the present invention, there is provided a method for relaying traffic information through a service server, the method comprising: an authentication step of authenticating a mobile communication terminal and a navigation terminal; a list providing step of providing the mobile communication terminal with a traffic information list; a traffic information data providing step of providing the mobile communication terminal with traffic information data; and a traffic information transfer step of receiving the traffic information requested by the mobile communication terminal from an application server and transferring the received traffic information to the mobile communication terminal.

In the embodiment, in the traffic information transfer step, the service server may transfer a traffic information conversion request to the application server or converts the traffic information by itself, based on hardware specifications of the mobile communication terminal or the navigation terminal, and transfer the traffic information converted by the application server or the service server to the mobile communication terminal.

To accomplish the above object, according to still another aspect of the present invention, there is provided a storage medium for storing the method for relaying traffic information through a service server described above as a program.

To accomplish the above object, according to still another aspect of the present invention, there is provided an application server for providing traffic information, the application server comprising: a communication unit for transmitting and receiving data through a mobile communication network; a traffic information management unit for managing the traffic information; a storage unit for storing the traffic information; and a control unit for controlling operations of each constitutional component and controls the communication unit to provide the service server with traffic information data and the traffic information.

In the embodiment, the application server may further comprise a conversion unit for converting the traffic information in response to a traffic information conversion command generated by the control unit.

To accomplish the above object, according to still another aspect of the present invention, there is provided a method for providing traffic information through an application server, the method comprising: an information providing step of providing a service server with traffic information data; and a traffic information providing step of providing the traffic information requested by the service server.

In the embodiment, the method may further comprise a traffic information conversion step of converting the traffic information in response to a request of the service server.

To accomplish the above object, according to still another aspect of the present invention, there is provided a storage medium for storing the method for providing traffic information through an application server described above as a program.

To accomplish the above object, according to still another aspect of the present invention, there is provided a mobile communication terminal for relaying traffic information, the mobile communication terminal comprising: a first communication unit for transmitting and receiving data through a mobile communication network; a second communication unit for transmitting and receiving data through a short-range communication network; a navigation terminal management unit for managing information on a navigation terminal received through the second communication unit; a storage unit for storing the navigation terminal information; and a control unit for controlling operations of each constitutional component, examining whether or not the navigation terminal can perform a service and unique identification information is valid, and controlling the first and second communication units to transfer a traffic information request of the navigation terminal to a service server and transfer the traffic information received from the service server to the navigation terminal.

To accomplish the above object, according to still another aspect of the present invention, there is provided a method for relaying traffic information through a mobile communication terminal, the method comprising: an authentication step of authenticating a navigation terminal; a list request transfer step of transferring a traffic information list request to a service server; a traffic information data transfer step of transferring a traffic information list received from the service server to the navigation terminal; and a traffic information transfer step of transferring the traffic information received from the service server to the navigation terminal. In the embodiment, the method may further comprise an execution step of storing and executing the traffic information received from the service server.

To accomplish the above object, according to still another aspect of the present invention, there is provided a storage medium for storing the method for relaying traffic information through a mobile communication terminal described above as a program.

To accomplish the above object, according to still another aspect of the present invention, there is provided a navigation terminal for executing traffic information received through a short-range communication network, the navigation terminal comprising: an input unit for receiving a user command; a communication unit for transmitting and receiving data through the short-range communication network; an execution unit for executing the traffic information; and a control unit for controlling operations of each constitutional component and controlling the communication unit to transmit a traffic information request signal to a mobile communication terminal and receive the traffic information from the mobile communication terminal.

In the embodiment, the navigation terminal may further comprise a storage unit for storing the received traffic information, together with navigation terminal identification information.

To accomplish the above object, according to still another aspect of the present invention, there is provided a method for executing traffic information received through a short-range communication network, the method comprising: an authentication request step of transmitting unique identification information to a mobile communication terminal through the short-range communication network and requesting authentication on the unique identification information; a confirmation step of confirming a traffic information list and traffic information data received from the mobile communication terminal; a traffic information request step of transmitting traffic information request information to the mobile communication terminal; and an execution step of executing the traffic information received from the mobile communication terminal.

To accomplish the above object, according to still another aspect of the present invention, there is provided a storage medium for storing the method for executing traffic information received through a short-range communication network described above as a program.

DETAILED DESCRIPTION OF THE PREFERRED EMBODIMENT

Figure 1:
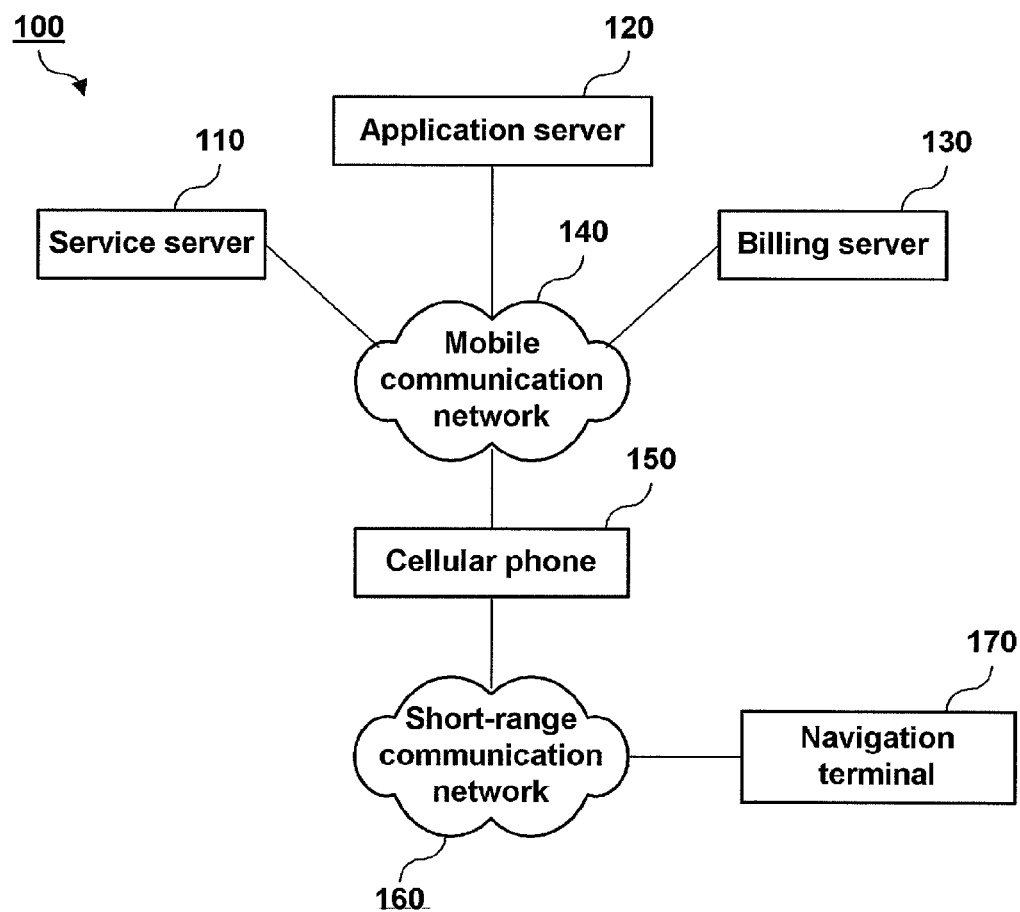
FIG. 1 a block diagram showing a system for providing traffic information according to an embodiment of the invention.

The preferred embodiments of the invention will be hereafter described in detail, with reference to the accompanying drawings.

The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

First, a system for providing traffic information using a short-range communication network according to an embodiment of the invention will be described with reference to FIG. 1.

FIG. 1 is a block diagram showing a system for providing traffic information according to an embodiment of the invention.

As shown in FIG. 1, in a system for providing traffic information using a short-range communication network according to the embodiment 100 (hereinafter, 'a system for providing traffic information using a short-range communication network' will be simply referred to as 'a traffic information providing system' for the convenience of explanation, unless otherwise specified), a service server 110, an application server 120, a billing server 130 and a mobile communication terminal 150 are connected to one another through a mobile communication network 400, and the mobile communication terminal 150 is connected to a navigation terminal 170 through the short-range communication network 160.

The navigation terminal 170 is connected to the mobile communication terminal 150 through the short-range communication network 160 and executes traffic information requested and received from the application server 120. The short-range communication network 160 used in this system can be a wireless LAN, a Bluetooth, an UltraWideBand (UWB), or the like.

The mobile communication terminal 150 is connected to the navigation terminal 170 through the short-range communication network 160 and connected to the service server 110 through the mobile communication network 140. The mobile communication terminal 150 transfers data between the navigation terminal 170 and the service server 110. To this end, the mobile communication terminal 150 is provided with a communication unit for communicating with the short-range communication network 160, in addition to a communication unit for communicating with the mobile communication network 140.

The service server 110 is connected to the mobile communication terminal 150 and the application server 120 through the mobile communication network 140. The service server 110 performs authentication for the navigation terminal 170 and the mobile communication terminal 150 and requests the application server 120 to provide traffic information requested by the authenticated navigation terminal 170.

The application server 120 is connected to the service server 110 through the mobile communication network 140 and provides traffic information requested by the navigation terminal 170.

The billing server 130 is connected to the service server 110 through the mobile communication network 140. The billing server 130 performs a billing process for the mobile communication terminal 150 when the traffic information is provided to the navigation terminal 170 from the application server 120. On the other hand, it is notable that the billing server 130 may also performs a billing process for the navigation terminal 170.

On the other hand, it is notable that the service server 110, the application server 120, the billing server 130 and the mobile communication network 140 can be connected to one another through a wired communication network (not shown) or the like, other than the mobile communication network 140. In addition, it is notable that the application server 120 and the billing server 130 can be included in the service server 100 as a constitutional component.

Hereinafter, a method for providing traffic information using a short-range communication network according to an embodiment of the invention will be described with reference to FIGS. 6 to 10.

Figure 6:
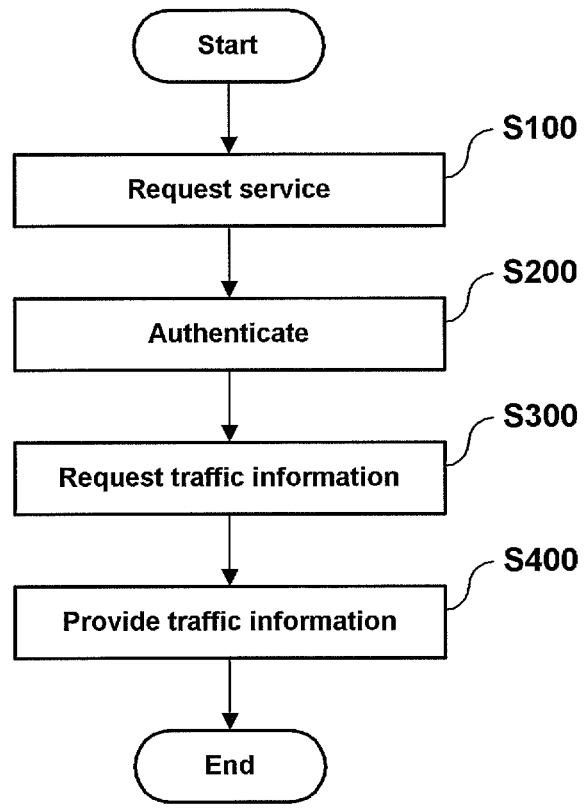
FIG. 6 is a flowchart illustrating a method for providing traffic information according to an embodiment of the invention.
Figure 7:
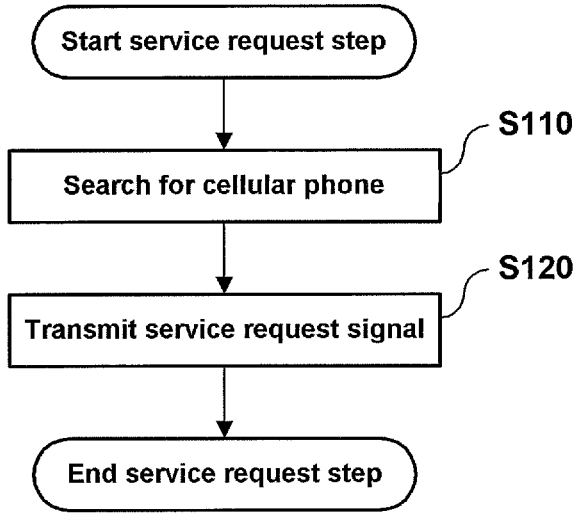
FIG. 7 is a detailed flowchart illustrating a service request step in FIG. 6.
Figure 8:
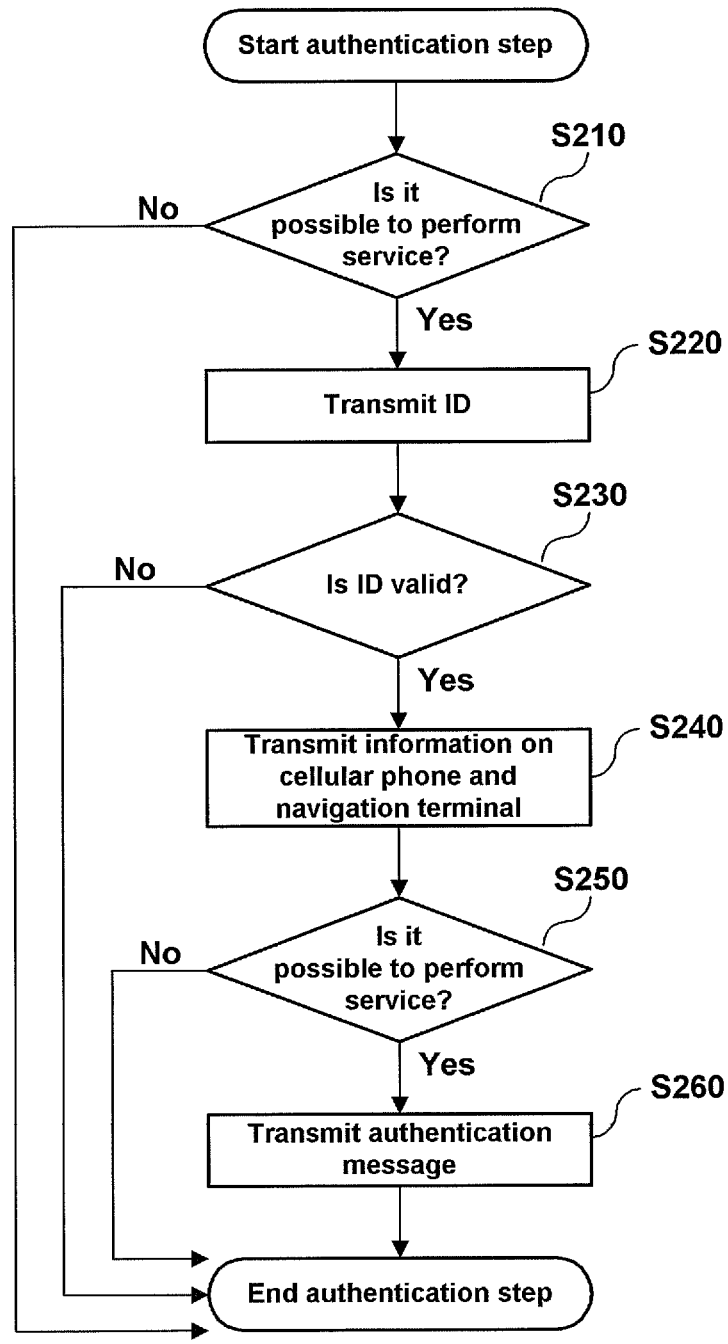
FIG. 8 is a detailed flowchart illustrating an authentication step in FIG. 6.
Figure 9:
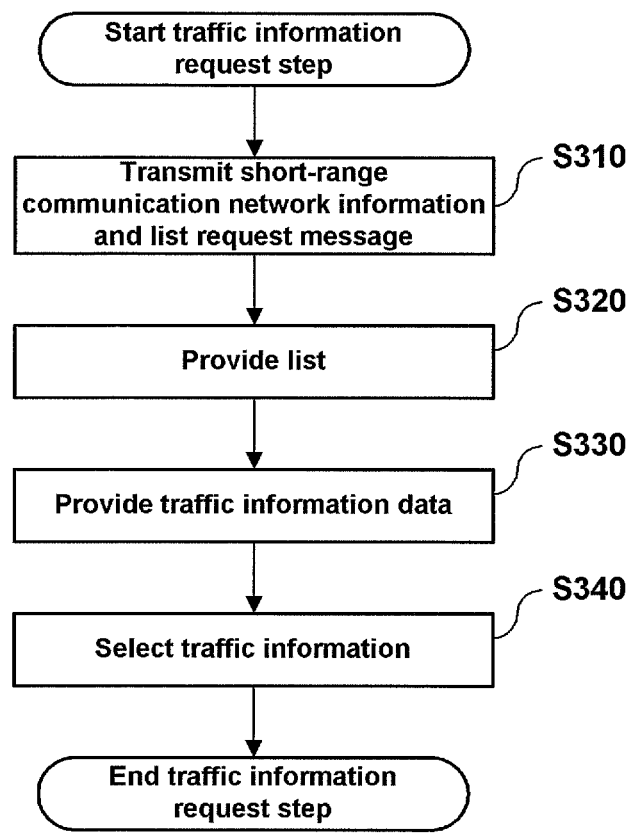
FIG. 9 is a detailed flowchart illustrating a traffic information request step in FIG. 6.
Figure 10:
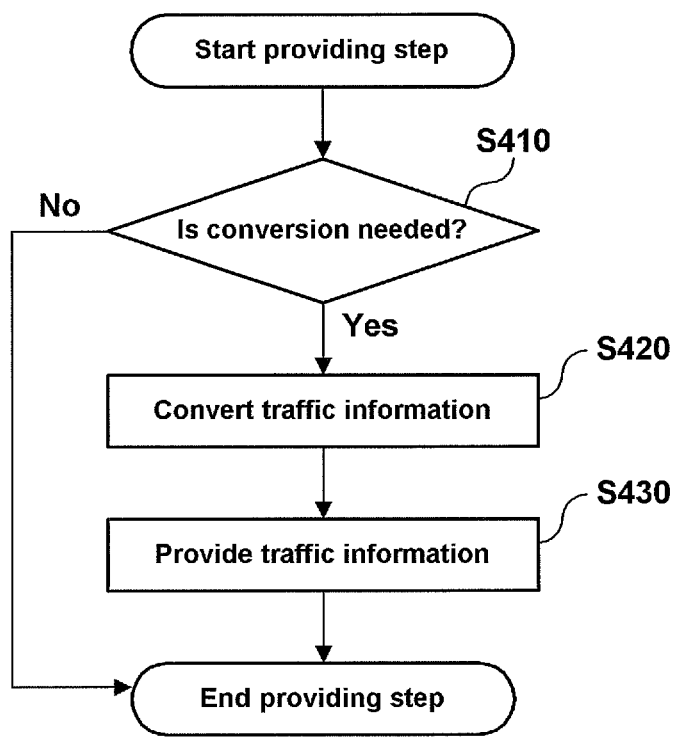
FIG. 10 is a detailed flowchart illustrating a providing step in FIG. 6.

FIG. 6 is a flowchart illustrating a method for providing traffic information according to an embodiment of the invention, FIG. 7 is a detailed flowchart illustrating a service request step in FIG. 6, FIG. 8 is a detailed flowchart illustrating an authentication step in FIG. 6, FIG. 9 is a detailed flowchart illustrating a traffic information request step in FIG. 6, and FIG. 10 is a detailed flowchart illustrating a providing step in FIG. 6.

As shown in FIG. 6, a method for providing traffic information using a short-range communication network according to the embodiment (hereinafter, 'a method for providing traffic information using a short-range communication network' will be simply referred to as 'a traffic information providing method' for the convenience of explanation, unless otherwise specified) includes a service request step S100, an authentication step S200, a traffic information request step S300, and a providing step S400.

In the service request step S100, the navigation terminal searches for a mobile communication terminal and transmits a service request signal to the searched mobile communication terminal. Describing the service request step S100 in detail with reference to FIG. 7, first, the navigation terminal searches for a mobile communication terminal through the short-range communication network S110. Next, the navigation terminal transmits a service request signal to the mobile communication terminal S120.

In the authentication step S200, the service server performs authentication for the navigation terminal and the mobile communication terminal in order to provide a service. Describing the authentication step S200 in detail with reference to FIG. 8, as a first authentication step, the mobile communication terminal examines whether or not the navigation terminal is a device capable of performing the service S210. The items examined in this step can be hardware specifications of the navigation terminal, whether or not the service server is registered as an authentication device, and the like.

As a second authentication step, if the navigation terminal is determined as a device capable of performing the service in the first authentication step, the navigation terminal transmits unique identification information of the navigation terminal to the mobile communication terminal S220.

As a third authentication step, the mobile communication terminal examines whether or not the unique identification information of the navigation terminal is valid S230. Examining whether or not the unique identification information is valid is examining whether or not the format of the unique identification information matches to a unique identification information format specified by the service server.

As a fourth authentication step, if the unique identification information is determined to be valid in the third authentication step, the mobile communication terminal transmits unique identification information of the mobile communication terminal and the navigation terminal to the service server S240.

As a fifth authentication step, the service server examines whether or not the mobile communication terminal and the navigation terminal are in a state capable of performing the service, based on the unique identification information and membership information of the mobile communication terminal and the navigation terminal S250. The state capable of performing the service is a state in which the mobile communication terminal is activated normally and hardware specifications of the mobile communication terminal and the navigation terminal are sufficient to perform the service. Here, the hardware specifications of the mobile communication terminal and the navigation terminal are preferably stored in a storage unit of the service server. In addition, the membership information is needed to confirm whether or not a customer is a member of a service plan allowed to use the service.

As a sixth (←fifth) authentication step, if the mobile communication terminal and the navigation terminal are determined to be capable of performing the service in the fifth authentication step, the service server transmits an authentication message to the navigation terminal S260. The authentication message is transferred to the navigation terminal via the mobile communication terminal.

In the traffic information request step S300, the navigation terminal selects traffic information from a list provided by the service server and requests transmission of the traffic information. Describing the traffic information request step S300 in detail with reference to FIG. 9, as a first traffic information request step, the navigation terminal transmits information on the connected short-range communication network and a list request message to the service server S310. The information on the short-range communication network includes information on the type of the short-range communication network.

As a second traffic information request step, the service server transmits the requested list to the navigation terminal S320. The list provided in this step may include information on whether or not the traffic information can be stored, billing information, and the like.

As a third traffic information request step, the service server transmits traffic information data included in the requested list to the navigation terminal S330. The traffic information data transmitted in this step may include descriptions on the traffic information, a type of a short-range communication network capable of transmitting the traffic information, billing information, a traffic information size, a transmission type of the traffic information, and the like.

As a fourth traffic information request step, the navigation terminal selects and transmits traffic information data included in the list to the service server S340. At this point, the navigation terminal may additionally perform an operation of transmitting billing information to the billing server. The billing information includes information such as payment on the mobile communication terminal, prepayment, and the like.

In the providing step S400, the application server provides the traffic information requested by the navigation terminal. Describing the providing step S400 in detail with reference to FIG. 10, as a first providing step, the service server examines whether or not the selected traffic information needs to be converted S410. The traffic information needs to be converted if the data structure and the like of the traffic information need to be converted for the navigation terminal and/or the mobile communication terminal to execute the traffic information. In this case, the service server examines whether or not the selected traffic information needs to be converted in order to be executed under the specifications of the navigation terminal or the mobile communication terminal.

As a second providing step, if the traffic information is determined to be converted in the first providing step, the service server requests the application server to convert the traffic information, or the service server itself converts the traffic information S420.

As a third providing step, the service server transmits the converted traffic information to the navigation terminal S430. That is, the converted traffic information is transmitted from the application server to the navigation terminal via the service server and the mobile communication terminal.

Hereinafter, a service server for relaying traffic information according to an embodiment of the invention and a relaying method using thereof will be described with reference to FIGS. 2 and 11.

Figure 2:
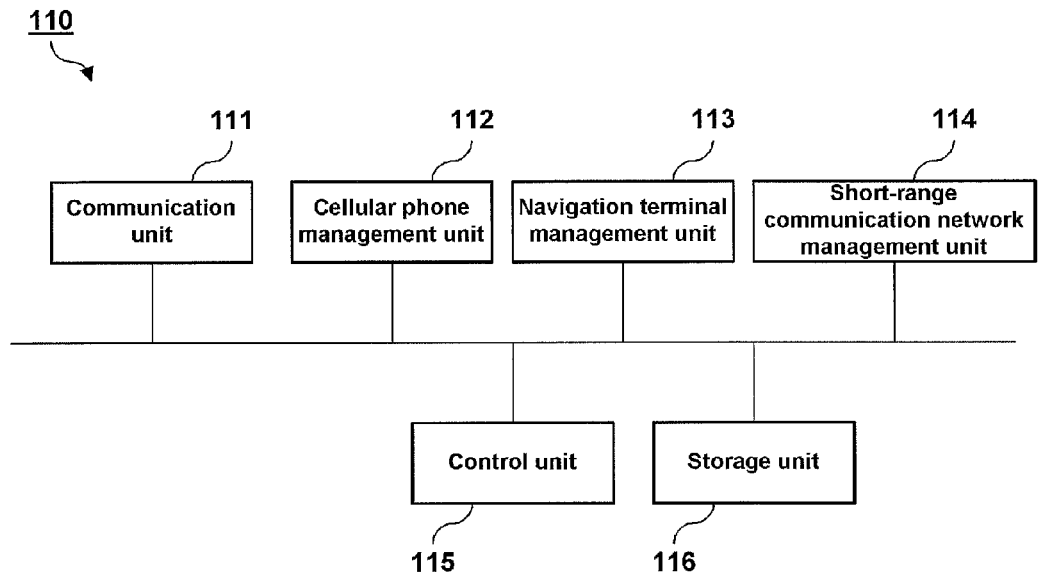
FIG. 2 is a detailed block diagram showing a service server in FIG. 1.
Figure 11:
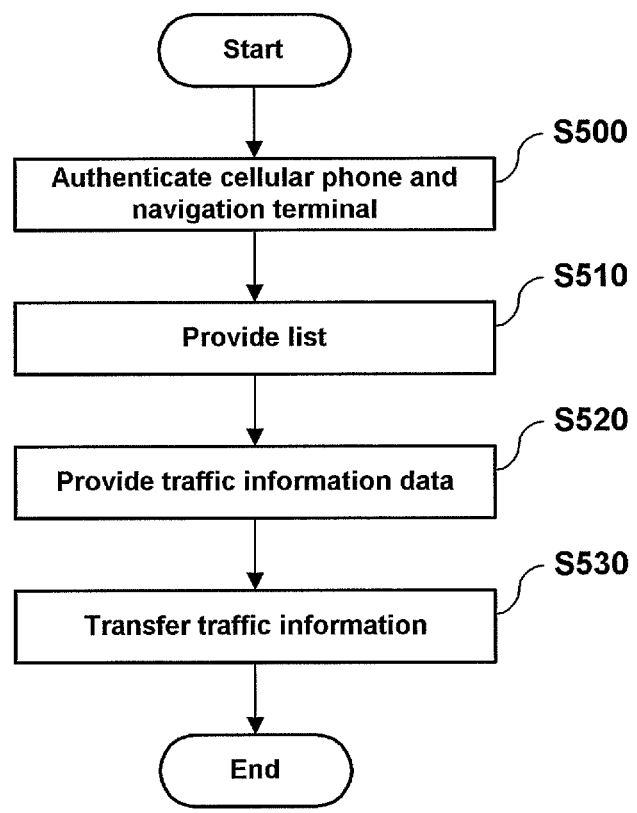
FIG. 11 is a flowchart illustrating a method for relaying traffic information through a service server according to an embodiment of the invention.

FIG. 2 is a detailed block diagram showing a service server in FIG. 1, and FIG. 11 is a flowchart illustrating a method for relaying traffic information through a service server according to an embodiment of the invention.

First, referring to FIG. 2, in a service server for relaying traffic information 110 (hereinafter, 'a service server for relaying traffic information' will be simply referred to as 'a service server' for the convenience of explanation, unless otherwise specified), a communication unit 111 transmits and receives data through a mobile communication network.

A mobile communication terminal management unit 112 manages information on a mobile communication terminal received through the communication unit 111. The managed mobile communication terminal information may include a type, hardware specifications, user information, and the like of the mobile communication terminal.

A navigation terminal management unit 113 manages information on the navigation terminal received through the communication unit 111. The managed navigation terminal information may include a type, hardware specifications, a unique account, and the like of the navigation terminal.

A short-range communication network management unit 114 manages information on the short-range communication network that relays communications between the mobile communication terminal and the navigation terminal. The managed short-range communication network information may include specifications of the short-range communication network, a log-in account if log-in is required, and the like.

A storage unit 116 stores the mobile communication terminal information, the navigation terminal information, and the short-range communication network information.

A control unit 115 controls operations of each constitutional component, authenticates the mobile communication terminal and the navigation terminal based on the mobile communication terminal information and the navigation terminal information, and controls the communication unit 111 to transfer the traffic information received from the application server to the mobile communication terminal.

Hereinafter, a method for relaying traffic information through a service server will be described with reference to FIG. 11.

As a first step, the service server authenticates the mobile communication terminal and the navigation terminal S500.

As a second step, the service server provides the mobile communication terminal with a traffic information list S510.

As a third step, the service server provides the mobile communication terminal with traffic information data S520.

As a fourth step, the service server receives the traffic information requested by the mobile communication terminal from the application server and transfers the traffic information to the mobile communication terminal S530. Here, it is notable that the service server transfers a traffic information conversion request to the application server or converts the traffic information by itself, based on the hardware specifications of the mobile communication terminal and the navigation terminal, and transfers the traffic information converted by the application server or the service server to the mobile communication terminal.

On the other hand, the relaying method described above is stored in a storage medium as a program.

Hereinafter, an application server for providing traffic information according to an embodiment of the invention and a method for providing traffic information using thereof will be described with reference to FIGS. 3 and 13.

Figure 3:
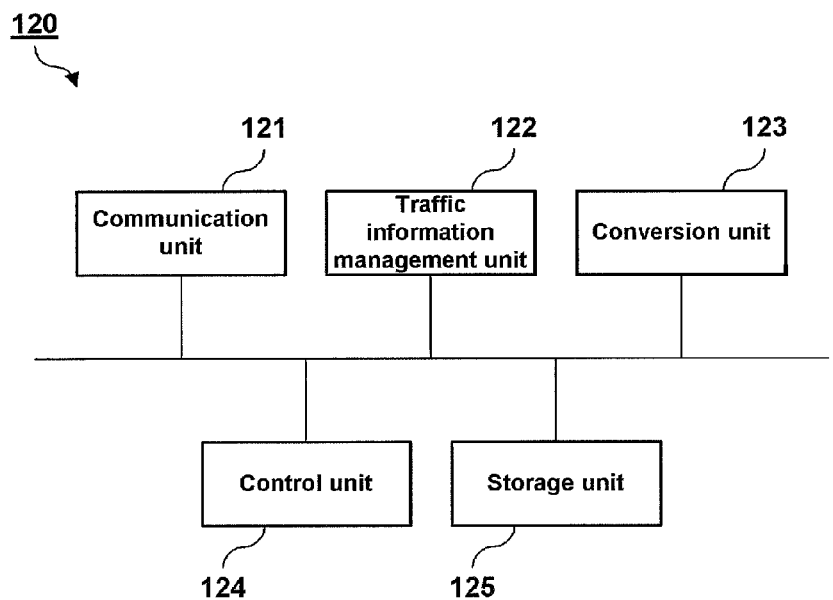
FIG. 3 is a detailed block diagram showing an application server in FIG. 1.
Figure 13:
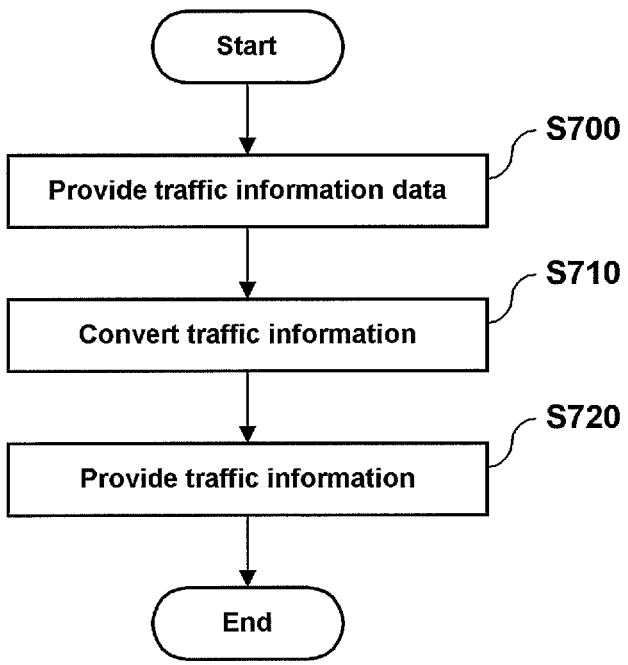
FIG. 13 is a flowchart illustrating a method for relaying traffic information through an application server according to an embodiment of the invention.

FIG. 3 is a detailed block diagram showing an application server in FIG. 1, and FIG. 13 is a flowchart illustrating a method for relaying traffic information through an application server according to an embodiment of the invention.

First, referring to FIG. 3, in an application server for providing traffic information 120 (hereinafter, 'an application server for providing traffic information' will be simply referred to as 'an application server' for the convenience of explanation, unless otherwise specified), a communication unit 121 transmits and receives data through a mobile communication network.

A traffic information management unit 122 manages traffic information. The items of the managed traffic information may include descriptions on traffic information, a type of a short-range communication network capable of transmitting the traffic information, billing information, a traffic information size, a data structure and a transmission type of the traffic information, and the like.

A conversion unit 123 converts the traffic information in response to a traffic information conversion command generated by a control unit 124.

The control unit 124 controls operations of each constitutional component, controls the communication unit 121 to provide the service server with traffic information data, controls the conversion unit 123 to convert the traffic information if a traffic information conversion request is received from the service server, and controls the communication unit 121 to provide the service server with the traffic information.

A storage unit 125 stores the traffic information.

Hereinafter, a method for providing traffic information will be described with reference to FIG. 13. As a first step, the application server provides the service server with traffic information data S700.

As a second step, the application server converts the traffic information in response to a request of the service server S710.

As a third step, the application server provides the traffic information requested by the service server S720.

On the other hand, the traffic information providing method described above is stored in a storage medium as a program.

Hereinafter, a mobile communication terminal for relaying traffic information according to an embodiment of the invention and a method for relaying traffic information using thereof will be described with reference to FIGS. 4 and 12.

Figure 4:
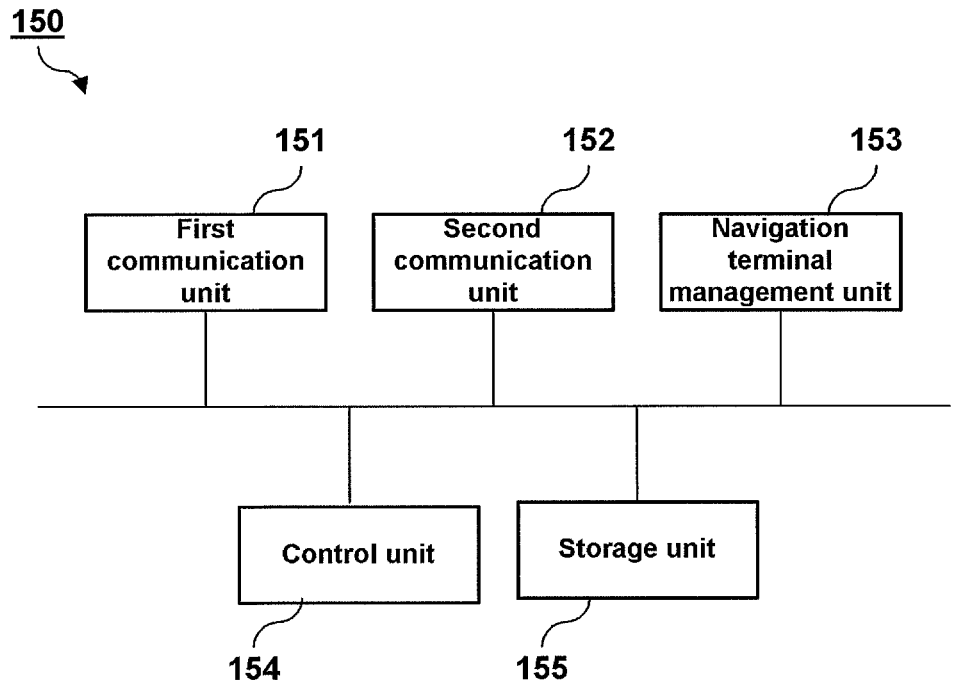
FIG. 4 is a detailed block diagram showing a mobile communication terminal in FIG. 1.
Figure 12:
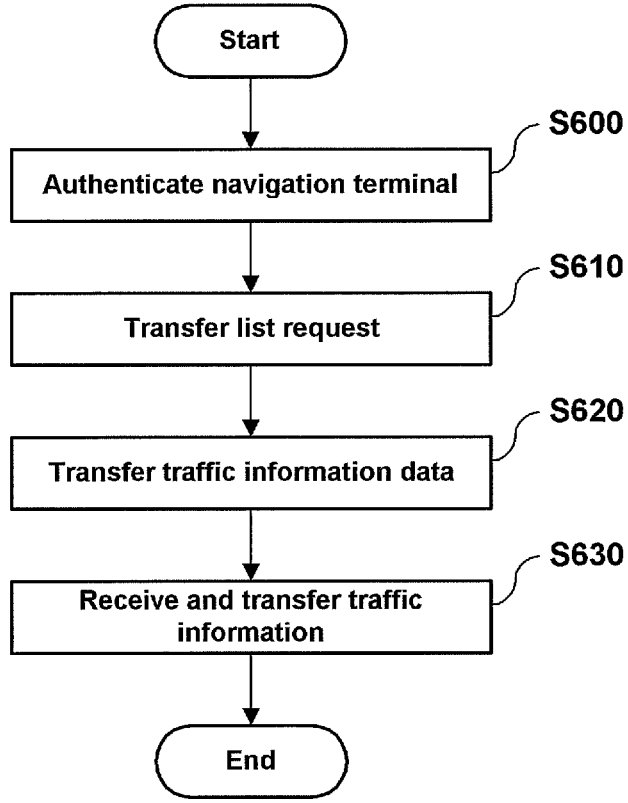
FIG. 12 is a flowchart illustrating a method for relaying traffic information through a mobile communication terminal according to an embodiment of the invention.

FIG. 4 is a detailed block diagram showing a mobile communication terminal in FIG. 1, and FIG. 12 is a flowchart illustrating a method for relaying traffic information through a mobile communication terminal according to an embodiment of the invention.

First, referring to FIG. 4, in a mobile communication terminal for relaying traffic information according to the embodiment 150 (hereinafter, 'a mobile communication terminal for relaying traffic information' will be simply referred to as 'a mobile communication terminal' for the convenience of explanation, unless otherwise specified), a first communication unit 151 transmits and receives data through a mobile communication network.

A second communication unit 152 transmits and receives data through a short-range communication network. In order to accept various types of short-range communication networks, the second communication unit 152 may accommodate two or more short-range communication specifications.

A navigation terminal management unit 153 manages information on the navigation terminal received through the second communication unit 152.

A storage unit 155 stores the navigation terminal information. The storage unit 155 may store the traffic information received from the service server as needed. As the received traffic information is stored in the storage unit 155, the mobile communication terminal 150 also can execute the received traffic information, and if the traffic information is not completely transmitted to the navigation terminal due to communication problems, the incompletely transmitted part of the traffic information can be transmitted when the communication path is recovered to normal.

A control unit 154 controls operations of each constitutional component. Particularly, the control unit 154 examines whether or not the navigation terminal can perform the service and the unique identification information is valid, and controls the first and second communication units to transfer a traffic information request of the navigation terminal to the service server and transfer the traffic information received from the service server to the navigation terminal.

Hereinafter, a relaying method is described with reference to FIG. 12. As a first step, the mobile communication terminal authenticates the navigation terminal S600.

As a second step, the mobile communication terminal transfers a traffic information list request to the service server S610.

As a third step, the mobile communication terminal transfers a traffic information list received from the service server to the navigation terminal S620.

As a fourth step, the mobile communication terminal transfers traffic information received from the service server to the navigation terminal S630. It is notable that the traffic information received in this step can be stored in the storage unit for buffering or to be executed. In addition, the relaying method may further include an execution step of storing and executing the traffic information received from the service server.

On the other hand, the relaying method described above may be stored in a storage medium as a program.

Hereinafter, a navigation terminal for executing traffic information received through a short-range communication network according to an embodiment of the invention and an execution method thereof will be described with reference to FIGS. 5 and 14.

Figure 5:
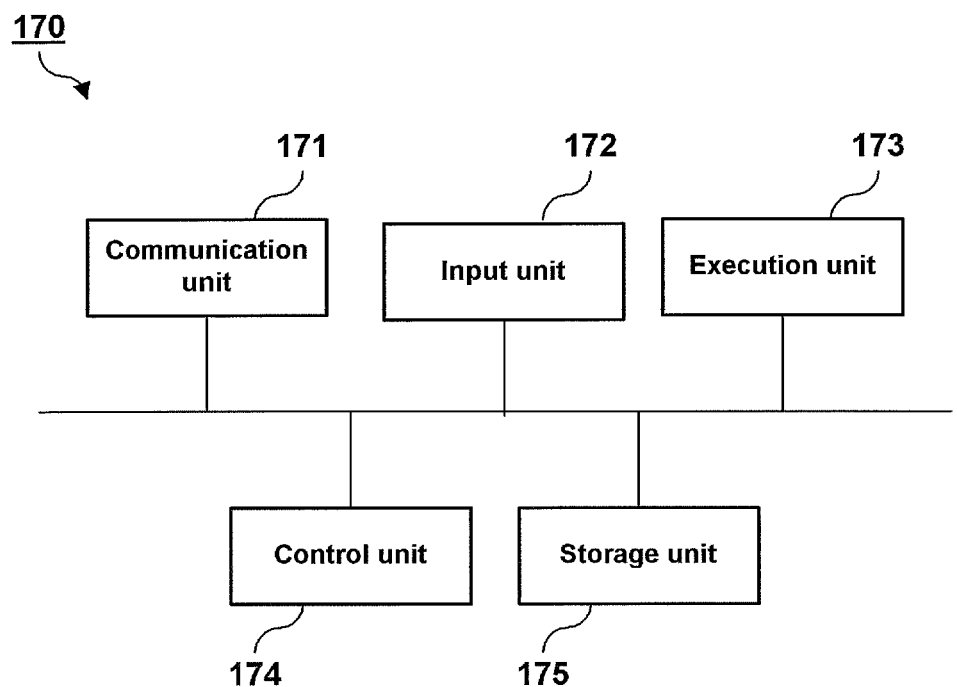
FIG. 5 is a detailed block diagram showing a navigation terminal in FIG. 1.
Figure 14:
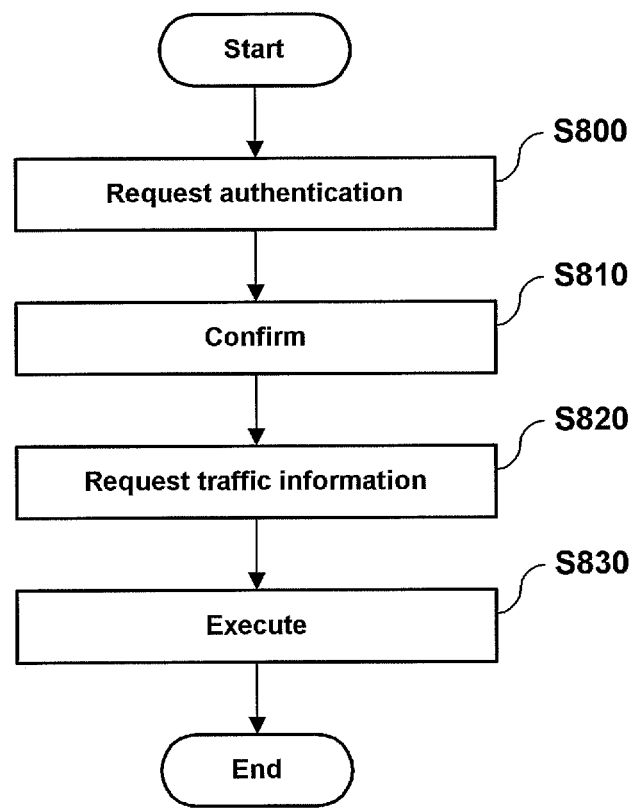
FIG. 14 is a flowchart illustrating a method for executing traffic information received through a short-range communication network according to an embodiment of the invention.

FIG. 5 is a detailed block diagram showing a navigation terminal in FIG. 1, and FIG. 14 is a flowchart illustrating a method for executing traffic information received through a short-range communication network according to an embodiment of the invention.

First, referring to FIG. 5, in a navigation terminal for executing traffic information received through a short-range communication network according to the embodiment 170 (hereinafter, 'a navigation terminal for executing traffic information received through a short-range communication network' will be simply referred to as 'a navigation terminal' for the convenience of explanation, unless otherwise specified), a communication unit 171 transmits and receives data through the short-range communication network.

An input unit 172 receives a user command. Input means, such as a remote controller, a switch, a keypad, a touch screen and the like, can be used as the input unit 172.

An execution unit 173 executes traffic information received through the communication unit 171. The execution unit 173 may include a data processing unit, a sound processing unit and the like for executing the traffic information.

A control unit 174 controls operations of each constitutional component, and controls the communication unit 171 to transmit a traffic information request signal to the mobile communication terminal and receive traffic information from the mobile communication terminal.

A storage unit 175 stores the received traffic information, together with navigation terminal identification information.

Hereinafter, an execution method will be described with reference to FIG. 14.

As a first step, the navigation terminal transmits unique identification information to the mobile communication terminal through the short-range communication network and requests authentication on the unique identification information S800.

As a second step, the navigation terminal confirms a traffic information list and traffic information data received from the mobile communication terminal S810.

As a third step, the navigation terminal transmits traffic information request information to the mobile communication terminal S820.

As a fourth step, the navigation terminal executes traffic information received from the mobile communication terminal S830.

On the other hand, the execution method described above may be stored in a storage medium as a program.

Embodiments of the present invention have been described above with reference to the accompanying drawings.

According to the present invention, there is provided a technique in which a navigation terminal downloads desired traffic information from an application server connected to a mobile communication network using a mobile communication terminal searched through a short-range communication network, and executes the downloaded traffic information.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for providing traffic information through a short-range communication network, performed by a system in which a navigation terminal is connected to a mobile communication terminal through the short-range communication network, and the mobile communication terminal, a service server and an application server are connected to one another through a mobile communication network, the method comprising:

an authentication step of allowing the service server to perform authentication for the navigation terminal and the mobile communication terminal in order to provide a service;

a traffic information request step of allowing the navigation terminal to select the traffic information from a list provided by the service server and request transmission of the traffic information; and a providing step of allowing the application server to provide the traffic information requested by the navigation terminal, wherein the authentication step includes:

a first authentication step of allowing the mobile communication terminal to examine whether or not the navigation terminal is a device that can perform the service;

a second authentication step of allowing the navigation terminal to transmit unique identification information of the navigation terminal to the mobile communication terminal, if the navigation terminal is determined as a device that can perform the service in the first authentication step;

a third authentication step of allowing the mobile communication terminal to examine whether or not the unique identification information of the navigation terminal is valid;

a fourth authentication step of allowing the mobile communication terminal to transmit unique identification information of the mobile communication terminal and the navigation terminal to the service server, if the unique identification information is determined to be valid in the third authentication step;

a fifth authentication step of allowing the service server to examine whether or not the mobile communication terminal and the navigation terminal are in a state capable of performing the service, based on the unique identification information and membership information of the mobile communication terminal and the navigation terminal; and a sixth authentication step of allowing the service server to transmit an authentication message to the navigation terminal, if the mobile communication terminal and the navigation terminal are determined to be in a state capable of performing the service in the fifth authentication step.

2. The method according to claim 1, further comprising a service request step of allowing the navigation terminal to search for the mobile communication terminal and transmit a service request signal to the searched mobile communication terminal.

3. The method according to claim 1, wherein the traffic information request step includes:

a first traffic information request step of allowing the navigation terminal to transmit information on the connected short-range communication network and a list request message to the service server;

a second traffic information request step of allowing the service server to transmit a requested list to the navigation terminal;

a third traffic information request step of allowing the service server to transmit traffic information data included in the requested list to the navigation terminal; and a fourth traffic information request step of allowing the navigation terminal to select and transmit the traffic information data included in the list to the service server.

4. The method according to claim 3, wherein the traffic information data of the third traffic information request step includes descriptions on the traffic information, a type of a short-range communication network capable of transmitting the traffic information, billing information, a traffic information size, a traffic information format, and a transmission type of the traffic information.

5. The method according to claim 3, wherein in the fourth traffic information request steps, the navigation terminal additionally performs an operation of transmitting billing information to the billing server.

6. The method according to claim 1, wherein the providing step includes:

a first providing step of allowing the service server to examine whether or not the selected traffic information needs to be converted;

a second providing step of allowing the service server to request the application server to convert the traffic information or to convert the traffic information by itself, if the traffic information is determined to be converted in the first providing step; and a third providing step of allowing the service server to transmit the converted traffic information to the navigation terminal.

* * * * *